(12) United States Patent
Kulkarni et al.

(10) Patent No.: US 9,279,443 B2
(45) Date of Patent: Mar. 8, 2016

(54) DEVICE FOR REVERSING THE MOVEMENT AND/OR ACTUATION DIRECTION OF AN ACTUATING CABLE OF A MECHANISM

(71) Applicant: Johnson Controls Technology Company, Holland, MI (US)

(72) Inventors: Ketan Kulkarni, Leverkusen (DE); Thomas Beiling, Düsseldorf (DE)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 14/376,915

(22) PCT Filed: Feb. 4, 2013

(86) PCT No.: PCT/EP2013/052124
§ 371 (c)(1),
(2) Date: Aug. 6, 2014

(87) PCT Pub. No.: WO2013/117510
PCT Pub. Date: Aug. 15, 2013

(65) Prior Publication Data
US 2015/0033881 A1 Feb. 5, 2015

(30) Foreign Application Priority Data
Feb. 6, 2012 (DE) .......... 10 2012 201 709

(51) Int. Cl.
| F16C 1/10 | (2006.01) |
| F16C 1/22 | (2006.01) |
| F16C 1/12 | (2006.01) |
| F16C 1/14 | (2006.01) |

(52) U.S. Cl.
CPC . *F16C 1/12* (2013.01); *F16C 1/145* (2013.01); *Y10T 74/11* (2015.01); *Y10T 74/20402* (2015.01); *Y10T 74/20462* (2015.01)

(58) Field of Classification Search
CPC .............. F16C 1/10; F16C 1/145; F16C 1/12; Y10T 74/20402; Y10T 74/20462
USPC .................... 74/500.5, 501.5 R, 502.4, 502.6
See application file for complete search history.

(56) References Cited

U.S. PATENT DOCUMENTS

| 4,526,057 A | 7/1985 | Mochida et al. |
| 4,683,774 A | 8/1987 | Memmola |
| 4,884,468 A * | 12/1989 | Muramatsu et al. ......... 74/502.4 |
| 5,259,265 A | 11/1993 | Gabas et al. |
| 5,603,244 A * | 2/1997 | Tischer ....................... 74/500.5 |

(Continued)

FOREIGN PATENT DOCUMENTS

| CN | 1 891 963 A | 1/2007 |
| EP | 1741866 A2 | 1/2007 |
| FR | 2 765 926 A1 | 1/1999 |

(Continued)

*Primary Examiner* — Adam D Rogers
(74) *Attorney, Agent, or Firm* — McGlew and Tuttle, P.C.

(57) ABSTRACT

A device (1) is provided for reversing the movement and/or actuation direction of an actuating cable (2) of a mechanism. A sliding piston (5) is arranged in a housing (3), which is fixed to the frame, so as to be displaceable in a sliding manner. The sliding piston can be displaced by the actuating cable (2). At least one actuating element (6) is arranged laterally on the sliding piston (5). A direction of movement of the actuating element is opposite to a direction of movement of the actuating cable (2) and the actuating element is mechanically coupled to the mechanism that is actuated.

13 Claims, 2 Drawing Sheets

(56) References Cited

U.S. PATENT DOCUMENTS

| | | |
|---|---|---|
| 6,085,610 A | 7/2000 | Gabas et al. |
| 7,980,624 B2 | 7/2011 | Hillen et al. |
| 8,720,956 B2 * | 5/2014 | Murray .......................... 292/48 |
| 2011/0140461 A1 | 6/2011 | Murray |

FOREIGN PATENT DOCUMENTS

| | | |
|---|---|---|
| GB | 166 655 A | 7/1921 |
| JP | H 01124419 U | 8/1989 |
| JP | 2001304233 A | 10/2001 |
| JP | 2007-016588 A | 1/2007 |

\* cited by examiner

DEVICE FOR REVERSING THE MOVEMENT AND/OR ACTUATION DIRECTION OF AN ACTUATING CABLE OF A MECHANISM

CROSS REFERENCE TO RELATED APPLICATIONS

This application is a United States National Phase Application of International Application PCT/EP2013/052124 filed Feb. 4, 2013 and claims the benefit of priority under 35 U.S.C. §119 of German Patent Application DE 10 2012 201 709.7 filed Feb. 6, 2012, the entire contents of which are incorporated herein by reference.

FIELD OF THE INVENTION

The invention relates to a device for reversing the movement and/or actuation direction of an actuating cable of a mechanism, with the device including a sliding piston arranged so as to be displaceable in a sliding manner in a housing arranged fixed on a frame, the piston being displaced by the actuating cable, wherein at least one actuating element is arranged laterally on the sliding piston, the movement direction of the actuating element being opposed to that of the actuating cable.

BACKGROUND OF THE INVENTION

In the prior art, actuating cables for mechanisms arranged remotely in a vehicle are arranged or laid in such a manner that a reversal of a movement and/or actuation direction is not necessary. Under some circumstances, this requires the actuating cable to be laid in a large arc, as a result of which the requirement for construction space and length of the actuating cable increase.

FR 2 765 926 A1 describes a device for reversing the movement and/or actuation direction of an actuating cable of a mechanism.

GB 166 655 A describes a device with a plurality of actuating cables which are actuatable together or independently of one another.

U.S. Pat. No. 4,526,057 A describes a device which actuates two coupled mechanisms by means of an actuating cable.

SUMMARY OF THE INVENTION

It is an object of the present invention to specify a device for reversing the movement and/or actuation direction of an actuating cable of a mechanism, which device is improved in relation to the prior art.

According to the invention, a device is provided for reversing the movement and/or actuation direction of an actuating cable of a mechanism to be actuated. The device comprises a housing arranged fixed on a frame, the housing having a housing wall with a sliding piston arranged so as to be displaceable in a sliding manner in the housing. An actuating cable is mechanically coupled to the mechanism. The sliding piston is displaced by means of the actuating cable. At least one actuating element is arranged laterally on the sliding piston. A movement direction of the actuating element is opposed to a movement direction of the actuating cable. The housing wall has a groove shaped recess. A longitudinal extent of the groove shaped recess extends in a longitudinal direction of the housing and completely penetrates the housing wall. The sliding piston has a receiving section at least partially arranged in the groove shaped recess.

In the case of the device for reversing the movement and/or actuation direction of an actuating cable of a mechanism, according to the invention a sliding piston is arranged so as to be displaceable in a sliding manner in a housing arranged fixed on a frame, and can be displaced by means of the actuating cable, wherein at least one actuating element is arranged laterally on the sliding piston, the movement direction of which actuating element is opposed to that of the actuating cable and which is mechanically coupled to the mechanism. As a result, a reversal of the movement and/or actuation direction of the actuating cable is made possible in a simple manner saving on construction space.

In an advantageous embodiment, a plurality of actuating elements are arranged on the sliding piston, as a result of which a plurality of actuating elements are actuable in a simple manner by means of an individual actuating cable.

A movement direction of each actuating element here can be formed in the same direction or in an opposed direction to the movement direction of the actuating cable.

The housing is expediently formed cylindrically or in a cup shaped manner and has an open first end and a closed second end.

In a particularly advantageous embodiment, on the outside of the housing at the closed end, at least one fastening section is arranged on an end side and/or on an outer circumference. By means of this fastening section, the housing can be arranged fixed on the frame on or in, for example, a vehicle.

In a further advantageous embodiment, a groove shaped recess is introduced into a housing wall of the housing, the longitudinal extent of which recess extends in the longitudinal direction of the housing and which completely penetrates the housing wall, wherein a receiving section of the sliding piston is at least partially arranged in the groove shaped recess. The receiving section of the sliding piston projects here over the housing wall of the housing, and therefore the actuating element can be arranged thereon.

In an expedient embodiment, on the inside of the closed end, a receiving section is formed in the housing, said receiving section being formed in a manner corresponding to a receiving nipple, which is integrally formed on the end side of the actuating cable, and receiving said receiving nipple in an interlocking and/or frictional manner such that it is fixed on the frame.

In a further expedient embodiment, a leadthrough for a cable wire of the actuating cable, through which leadthrough the cable wire is led through during the operation of the device, is arranged centrally in the sliding piston, while a sheath of the actuating cable is supported on the sliding piston.

The device advantageously comprises a spring element which is designed as a compression spring and is arranged in the housing in such a manner that a first end of the spring element is supported on the housing on the inside of the closed end while a second end of the spring element acts on the sliding piston. A movement of the sliding piston can therefore be assisted by means of the spring action.

In a particularly advantageous manner, the device is designed as a compensator in such a manner that, in the event of a defect or a malfunction of the actuating cable, the mechanism coupled by means of the actuating element can be closed, wherein the spring element is formed in such a manner that release of the compressed spring element actuates a closure of the mechanism. A coupled mechanism can thereby be brought into an inoperative position or safety position, and therefore further damage can be averted.

Exemplary embodiments of the invention are explained in more detail below with reference to drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
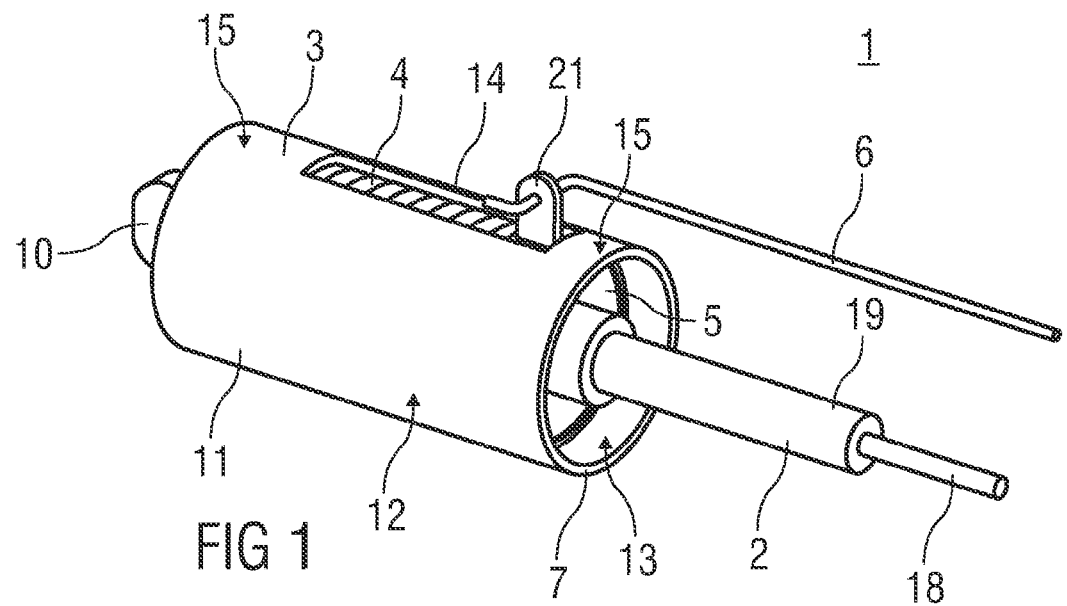
FIG. 1 is a schematic perspective view of a device according to the invention for reversing the movement and/or actuation direction of an actuating cable of a mechanism.

Referring to the drawings in particular, mutually corresponding parts are provided with the same reference signs in all of the drawings.

FIG. 1 schematically illustrates a perspective view of a device 1 according to the invention for reversing the movement and/or actuation direction of an actuating cable 2 of a mechanism (not depicted).

Figure 2:
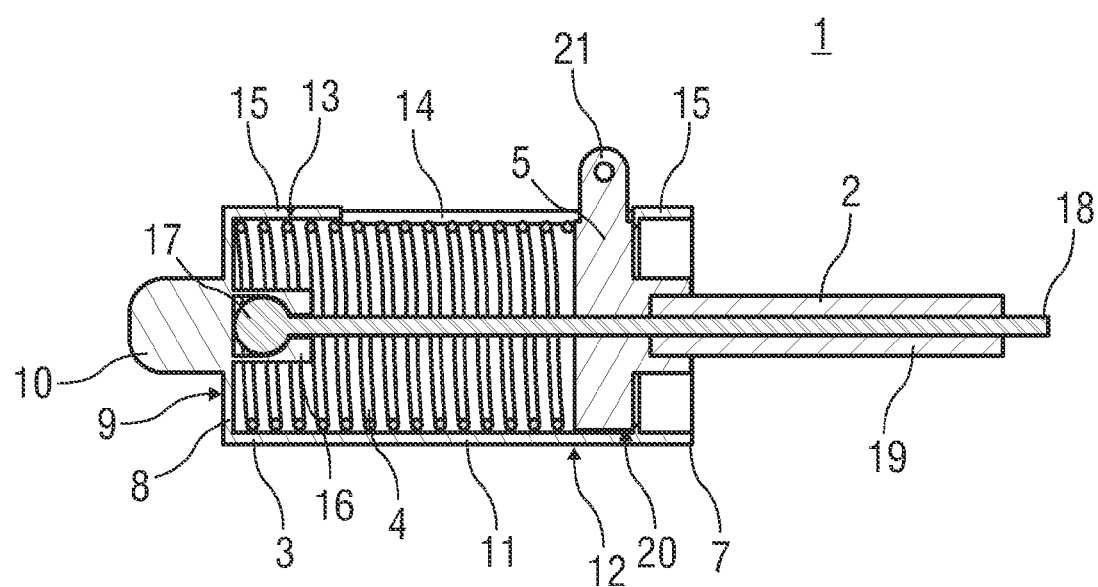
FIG. 2 is a schematic sectional illustration of a device according to the invention for reversing the movement and/or actuation direction of an actuating cable of a mechanism.

FIG. 2 schematically illustrates a sectional illustration of the device 1 according to the invention for reversing the movement and/or actuation direction of the actuating cable 2 of a mechanism.

Figure 3:
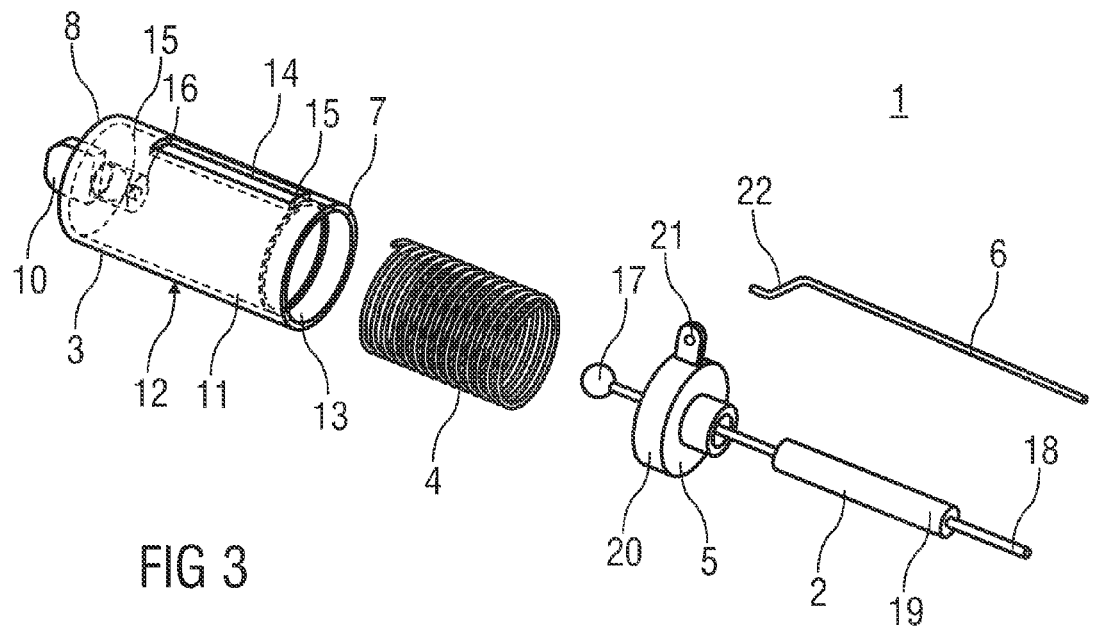
FIG. 3 is a schematic exploded illustration of a device according to the invention for reversing the movement and/or actuation direction of an actuating cable of a mechanism.

FIG. 3 schematically illustrates an exploded illustration of the device 1 according to the invention for reversing the movement and/or actuation direction of the actuating cable 2 of a mechanism.

Such a device 1 comprises at least a housing 3, a spring element 4, a sliding piston 5, an actuating cable 2 and at least one actuating element 6.

The housing 3 is preferably formed in a cup-shaped manner and has an open first end 7 and a closed second end 8. On the outside of the closed end 8, a fastening section 10 can be arranged on an end side 9 of the housing 3. The housing 3 can be arranged fixed on a frame on or in a vehicle by means of said fastening section 10. Said fastening section 10 can be designed, for example, as a conventional formation which can be received in the vehicle in an interlocking and/or frictional manner in a correspondingly formed fastening device (not illustrated). In alternative embodiments (not illustrated), conventional recesses which can be formed in a variable manner and in which conventional fastening means can be arranged can be introduced in the fastening section 10.

A housing wall 11 of the housing 3 is formed in a circular or virtually circular manner on the outer circumference 12 thereof and on the inner circumference 13 thereof and can be manufactured from a metallic material, a plastic or a plastics mixture. A groove shaped recess 14 is introduced into the housing wall 11, the longitudinal extent of which recess extends in the longitudinal direction of the housing 3 and which completely penetrates the housing wall 11. The length of the recess 14 is reduced here in comparison to the length of the housing 3, and therefore, on the end sides of the recess 14, a web region 15 is formed in each case in the housing wall 11 in the direction of the ends 7 and 8.

On the inside of the closed end 8, a receiving section 16 is formed in the housing 3, said receiving section being formed in a manner corresponding to a receiving nipple 17, which is integrally formed on the end side of the actuating cable 2, and receiving said receiving nipple in an interlocking and/or frictional manner such that it is fixed on a frame.

The actuating cable 2 is a conventional actuating cable or cable pull which is a movable machine element for transmitting a mechanical movement and/or a tensile force by means of a flexibly layable combination of a cable wire 18 and a sheath 19 which is stable in the running direction and surrounds the cable wire in the circumferential direction. On the end side, the receiving nipple 17 is arranged on the cable wire 18.

The sliding piston 5 is arranged so as to be displaceable in a sliding manner in the housing 3, wherein an outer circumference 20 of the sliding piston 5 is formed in a manner corresponding to the inner circumference 13 of the housing wall 11. The sliding piston 5 is preferably manufactured from a material, for example plastic, which forms a friction pairing having a low coefficient of friction with the material of the housing 3.

A leadthrough for the cable wire 18 of the actuating cable 2, through which the cable wire 18 is led during the operation of the device 1, is arranged centrally in the sliding piston 5 while the sheath 19 of the actuating cable 2 is supported on the sliding piston 5.

A receiving section 21 on which the actuating element 6 can be arranged in an interlocking and/or frictional manner is integrally formed or formed laterally on the sliding piston 5. For this purpose, for example, a recess, in which a fastening section 22 formed on the end side of the actuating element 6 can be arranged, is formed in the receiving section 21.

The actuating element 6 is designed, for example, as a conventional, rigid round rod, at the first end of which the fastening section 22 is integrally formed or formed, for example, by folding or bending, and the second end of which is coupled to the mechanism in a manner not illustrated.

The spring element 4 is preferably formed as a compression spring, for example as a conventional helical spring, and is arranged in the housing 3 in such a manner that a first end of the spring element 4 is supported on the housing 3 on the inside of the closed end 8, while a second end of the spring element 4 acts on the sliding piston 5. The spring element 4 here is formed in a manner corresponding to the inner circumference 13 of the housing wall 11.

Figure 4:
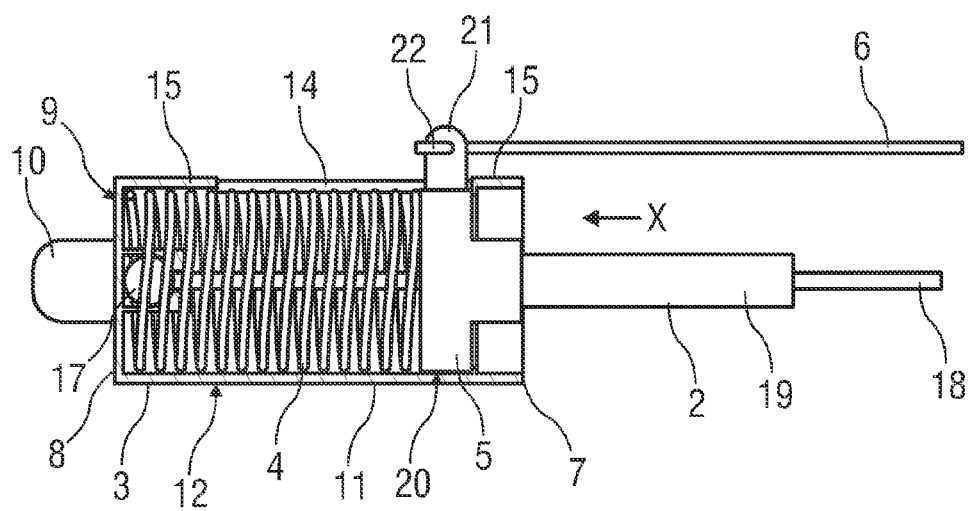
FIG. 4 is a schematic partial sectional illustration of a device according to the invention for reversing the movement and/or actuation direction of an actuating cable of a mechanism.

FIG. 4 schematically illustrates a partially transparent illustration of the device 1 according to the invention for reversing the movement and/or actuation direction of the actuating cable 2 of a mechanism.

During the operation of the device 1, the sliding piston 5 is displaced in the housing 3 by means of the actuating cable 2. A displacement of the sliding piston 5 in the direction X here brings about a compression of the spring element 4.

The compressed spring element 4 assists a return movement of the actuating cable 2 and of the sliding piston 5.

In an advantageous embodiment (not illustrated), a plurality of actuating elements 6 can be arranged on the receiving section 21 of the sliding piston 5, as a result of which a plurality of actuating elements 6 are actuatable at the same time by means of an individual actuating cable 2. Alternatively, a plurality of receiving sections 21 can be arranged on the sliding piston 5.

In a further advantageous embodiment (not illustrated), the device 1 can be designed as a compensator, wherein, in the event of a defect or a malfunction of the actuating cable 2, the device 1 closes the mechanism coupled by means of the actuating element 6. The spring element 4 here is formed in such a manner that release of the compressed spring element 4 actuates a closure of the mechanism.

While specific embodiments of the invention have been shown and described in detail to illustrate the application of the principles of the invention, it will be understood that the invention may be embodied otherwise without departing from such principles.

The invention claimed is:

1. A device comprising:
 a housing having a housing wall, an open first end portion, a closed second end portion and a receiving section, said receiving section being located adjacent to said closed second end portion;
 an actuating cable comprising an actuating wire;
 a sliding piston movably arranged in the housing such that said sliding piston is movable via the actuating cable;
 an actuating element connected to said sliding piston, wherein:
  the housing wall comprises a groove;
  the sliding piston has a receiving section at least partially arranged in the groove;
  a receiving nipple is integrally formed on an end side of the actuating cable; and
  the receiving section comprises a nipple receiving space, wherein said receiving nipple is arranged in said nipple receiving space to define an interlocking and/or frictional connection of the receiving section and the receiving nipple.

2. A device as claimed in claim 1, wherein the housing is cylindrically shaped, the receiving nipple being arranged on the actuating wire on the end side of the actuating cable.

3. A device as claimed in claim 2, further comprising:
 a spring element comprising a compression spring arranged in the housing wherein a first end of the spring element is supported on the housing on an inside of the closed end while a second end of the spring element acts on the sliding piston.

4. A device as claimed in claim 3, wherein at least said housing wall and said closed second end define an interior space of the housing, said receiving section being located in said interior space.

5. A device for reversing the movement and/or actuation direction of an actuating cable to be actuated, the device comprising:
 a housing having a housing wall;
 a sliding piston arranged so as to be displaceable in a sliding manner in the housing, the sliding piston being displaced by means of the actuating cable, the actuating cable comprising a cable wire;
 at least one actuating element arranged laterally on the sliding piston, a movement direction of the at least one actuating element being opposed to a movement direction of the cable wire, wherein:
  the housing wall has a groove;
  a longitudinal extent of the groove extends in a longitudinal direction of the housing and completely penetrates the housing wall;
  the sliding piston has a receiving section at least partially arranged in the groove;
  the housing has a closed end on an outside of the housing;
  the housing is formed cylindrically and has an open first end and the closed end;
  the actuating cable comprises a sheath;
  the cable wire is led through a leadthrough arranged centrally in the sliding piston during the operation of the device;
  the sheath is supported on the sliding piston;
  at least one fastening section is arranged on an end side of the closed end and/or on an outer circumference of the closed end;
  on an inside of the closed end, a receiving section is formed in the housing;
  a receiving nipple is integrally formed on an end side of the actuating cable;
  on the end side of the closed end, the receiving nipple is arranged on the cable wire;
  the receiving section is formed in a manner corresponding to the receiving nipple; and
  the receiving section receives the receiving nipple in an interlocking and/or frictional manner.

6. A device as claimed in claim 5, wherein the at least one actuating element comprises a plurality of actuating elements arranged on the sliding piston.

7. A device as claimed in claim 5, further comprising:
 a spring element comprising a compression spring arranged in the housing wherein a first end of the spring element is supported on the housing on the inside of the closed end while a second end of the spring element acts on the sliding piston.

8. A device as claimed in claim 7, wherein the device functions as a compensator in such a manner in the event of a defect or a malfunction of the actuating cable, wherein the spring element is formed in such a manner that release of the compressed spring element actuates the actuating element.

9. A device as claimed in claim 7, wherein the spring element is formed such that release of the compressed spring element actuates the actuating element whereby the device acts as a compensator in an event of a defect or a malfunction of the actuating cable.

10. A device for reversing the movement and/or actuation direction of an actuating cable to be actuated, the device comprising:
 a housing having a housing wall;
 a sliding piston arranged so as to be displaceable in a sliding manner in the housing, the sliding piston being displaced by means of the actuating cable, the cable wire comprising a cable wire;
 an actuating element arranged laterally of the sliding piston, a movement direction of the actuating element being opposed to a movement direction of the actuating wire, wherein:
  the housing wall defines a groove having a longitudinal extent, in a longitudinal direction of the housing;
  the groove completely penetrates the housing wall;
  the sliding piston has a receiving section at least partially arranged in the groove and connected to the actuating element;
  the housing is cylindrically shaped and has an open first end and a closed second end;
  the actuating cable comprises a sheath;
  the cable wire is led through a leadthrough arranged centrally in the sliding piston during the operation of the device;
  the sheath is supported on the sliding piston;
  on an inside of the closed second end, a receiving section is formed in the housing;

a receiving nipple is integrally formed on an end side of the actuating cable;

on the end side of the closed end, the receiving nipple is arranged on the cable wire; and the receiving section corresponds to the receiving nipple to define an interlocking and/or frictional connection of the receiving section and the receiving nipple.

11. A device as claimed in claim 10, further comprising another actuating element arranged laterally on the sliding piston to provide a plurality of actuating elements arranged on the sliding piston.

12. A device as claimed in claim 10, further comprising a fastening section connected to one of the closed second end and the housing wall adjacent to the closed second end.

13. A device as claimed in claim 10, further comprising:

a spring element comprising a compression spring arranged in the housing wherein a first end of the spring element is supported on the housing on the inside of the closed second end while a second end of the spring element acts on the sliding piston, wherein on the end side of the actuating cable, the receiving nipple is arranged on the cable wire.

\* \* \* \* \*